United States Patent Office 3,817,939
Patented June 18, 1974

3,817,939
ORGANIC CARBONATE SALTS AS ISOCYANATE TRIMERIZATION CATALYSTS
Michael George Allen, Hudson, Wis., and George Van Dyke Tiers, St. Paul, Minn., assignors to Minnesota Mining and Manufacturing Company, St. Paul, Minn.
No Drawing. Filed Feb. 21, 1973, Ser. No. 334,481
Int. Cl. C08g 22/40
U.S. Cl. 260—77.5 NC 9 Claims

ABSTRACT OF THE DISCLOSURE

Isocyanates are trimerized, polymerized, or reacted with polyols, in the presence of a catalytic amount of an organic carbonate salt to produce isocyanurates, polyisocyanurates, urethane-modified polyisocyanurates, or isocyanurate-modified polyurethanes. The organic carbonate salt catalyt is the reaction product of carbon dioxide and alkoxide or aryloxide.

BACKGROUND OF THE INVENTION

This invention relates to polyisocyanurates. In another aspect it relates to a process for making polyisocyanurates using catalysts having improved latency properties yet which allow rapid curing of polyisocyanurates and polyurethanes. In a further aspect, it relates to isocyanurate-derived crosslinked polymers containing isocyanate and urethane linkages and to a process for their preparation using certain novel catalysts. In yet a further aspect, the invention relates to novel organic carbonate salts and their preparation.

The trimerization of aliphatic or aromatic monoisocyanates, e.g., phenyl isocyanate, to produce isocyanurates is known. A host of trimerization catalysts have been disclosed, see e.g., Polyurethanes: Chemistry and Technology, part 1, by J. H. Saunders and K. C. Frisch, Interscience Pub., New York (1962), p. 94, and U.S. Pat. Nos. 2,979,485, 2,993,870, and 3,381,008. Such isocyanurates or trimers are useful as chemical intermediates in the polymer art. Catalytic trimerization of polyisocyanates, including isocyanate-terminated prepolymers, to produce polyisocyanurates and urethane-modified polyisocyanurates is also known, e.g., see U.S. Pat. Nos. 2,965,-614, 3,206,352, 3,211,704, and 3,280,066. Trimerization of isocyanates is especially of interest in urethane polymer chemistry to produce isocyanurate-modified polyurethanes and urethane-modified polyisocyanurates, e.g., see U.S. Pat. Nos. 3,168,483 and 3,179,626.

Though many of the catalysts disclosed as useful in the above-described prior art processes have merit, many of them have undesirable features. Heavy metal catalysts are often toxic or leave residues in the products resulting from their use. Other catalysts are corrosive and hazardous to use. Many catalysts are not active at room temperature or have very limited solubility in the reaction mixtures. Some are so active that they cannot be homogeneously dispersed in the reactants before localized curing occurs. Some catalysts are not applicable in the formation of foamed products.

SUMMARY OF THE INVENTION

Briefly, according to the invention, polyisocyanates are polytrimerized to yield useful polyisocyanurates by carrying out the polytrimerization in the presence of organic carbonate metal salt catalysts (or promoters). These catalysts preferably have the general formula

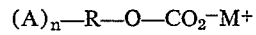

where A is a hydroxyl group or a hydrogen; $n$ is an integer from 1 to 3; R is a polyvalent hydrocarbon radical having a valence of $n+1$ and may be a saturated straight or a branched aliphatic radical having 2 to 18 carbon atoms (either of which may have one or more catenary ether oxygen atoms or thioether sulfur atoms), or a substituted or an unsubstituted aryl radical; and M is a cation of a strong base including alkali metal cations such as sodium, potassium and lithium, and quaternary ammonium cations such as tetraalkylammonium having alkyl groups with 1 to 18 carbon atoms.

The most preferred catalysts of the invention have hydroxyl functionality, i.e., they are of the formula

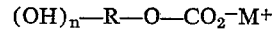

As such as they can become chemically bonded in the resin systems which they are used to catalyze and thus they provide no potential contamination hazard from residue catalyst leaching therefrom. Such a condition permits use of the catalyst of the invention to be used for curing films which can be used to wrap foods.

The polyisocyanates can be trimerized per se in the presence of the organic carbonate salts to produce polyisocyanurates, or polyisocyanates in admixture wtih polyols can be polymerized in the presence of the salts to produce poly(isocyanurate-urethanes), the salts preferably being added to the admixture in the form of a polyol solution. The salts mixed with the polyols are perferred because such solutions are generally more convenient to handle and use than powders, the normal undissolved form of the salts. Additionally, the salts are much more readily soluble in polyols than in polyisocyanates.

The organic carbonate salts and polyol solutions thereof used in this invention are relatively storage stable. The polyisocyanate or polyisocyanate/polyol mixtures containing such salts or solutions thereof are reaction mixtures having a desirably long pot-life at ambient temperature, e.g., 0 to 45° C. As such, the reaction mixtures are latently curable and can be readily applied, e.g., as a liquid coating composition which has been allowed to slowly cure at room temperature or moderately heated, e.g., to about 100° C., to effect a more rapid cure. The gel times of such reaction mixtures are relatively independent of their bulk and high catalyst levels can be used to get a "tight" or complete cure.

DETAILED DESCRIPTION OF THE INVENTION

Organic carbonate salts which can be used as catalysts in accordance with the invention are most conveniently prepared by reacting carbon dioxide with the alkoxide or aryloxide of a strong base, preferably in the presence of an organic solvent such as its corresponding alkanol or polyol. Other methods of producing the organic carbonate salts are known; e.g. see Adickes, Ber. 63, 3027 (1930) and Jones and Huges, J. Chem. Soc. 1934, 1198.

Representative alkoxides and aryloxides useful in the reaction are strongly basic compounds and are the alkali metal salts, such as the sodium, potassium and lithium salts of monohydric alkanols and phenols, and polyhydric alkanols, (e.g., having 1–18 carbon atoms) such as methanol, ethanol, propanol, isopropanol, butanol, octanol, dodecanol, and octadecanol; substituted alkanols, 2-dimethylaminoethanol, ethyleneglycol monoalkyl ethers, e.g., the "Cellosolves" such as 2-methoxy-, 2-ethoxy-, and 2-butoxyethanol, methyl glycolate, diethyleneglycol monoalkyl ethers, e.g., the "Carbitols" such as the methyl, ethyl, butyl and hexyl "Carbitols," benzyl alcohol, 2-phenylethanol, and 1-(1-methoxy-2-propoxy)-2-propanol; those cycloalkanols such as cyclohexanol, cyclopentenol, 4-cyclohexylcyclohexanol, and the like; those of unsaturated alcohols, such as allyl alcohol, propargyl alcohol, crotyl alcohol, undecenyl alcohol, and oleyl alcohol; those of heterocyclic alcohols, such as furfuryl alcohol and tetrahydrofurfuryl alcohol; those of phenols, such as phenol, m-cresol, 2-allylphenol, 4-t-butylphenol, 4-octylphenol, 3,4-xylenol, 2-chlorophenol, 4-chlorophenol, and 4-methoxyphenols; and those of polyhydric alkanols, e.g., those with 1–18 carbon atoms, such as ethylene glycol, 1,3-propylene glycol, 1,2-propylene glycol, glycerine, 1,4-butylene glycol, 1,2-butylene glycol, 1,6-hexylene glycol, 1,8-octylene glycol, 1,18-octadecylene glycol, tetra(hydroxymethyl) methane, and sorbitol; polyoxyalkylene polyols, e.g., those having a molecular weight from 106 to 2,000 or more such as diethylene glycol, dipropylene glycol, triethylene glycol, tetraethylene glycol, polyoxyethylene polyols and polyoxypropylene polyols; and thiodiethanol.

The organic carbonate salts may also be prepared by reacting carbon dioxide with the coordination compounds or complexes formed by admixing orthoborate esters derived from monohydric alcohols, 1,2- or 1,3-glycols with the alkoxide or aryloxide of a strong base such as these borate alkoxides described in assignee's copending application, S.N. 840,834 filed July 10, 1969, incorporated herein by reference. Borate esters that may be used include those from trialkyl borates, e.g., trimethyl borate, tributyl borate, o-cresol borate, and the like. For a complete discussion of borate esters see *The Organic Chemistry of Boron*, W. Gerrard, Academic Press, New York, 1961, chapter 5. Other borates that may be used include cyclic borate alkoxides obtained from glycols. An especially preferred borate alkoxide is that derived from trihexyleneglycol biborate having the structure:

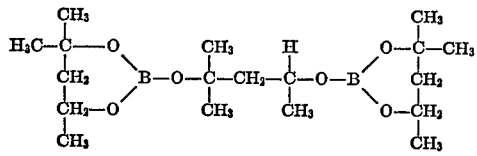

The polyisocyanates that can be polytrimerized with carbonate salts according to the invention are known. Particularly useful polyisocyanate compounds which can be used in this invention can be represented by the formula $R(NCO)_n$ where R is aryl or alkaryl and $n$ is 2 to 5 or higher, such as 2,4- and 2,6-tolylene diisocyanates, 1,5-naphthylene diisocyanates; 4,4'-diisocyanato diphenylmethane; 3,3'-dimethyl-4,4'-biphenylene diisocyanate; 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, and 4,4',4''-triisocyanatotriphenylmethane. The so-called polymeric polyisocyanates can also be used, such as those obtained by phosgenation of polyamines prepared by condensing formaldehyde with aromatic amines; particularly useful polymeric polyisocyanates are the polymethylene polyphenyl isocyanates, such as those sold commercially under the tradenames of "Mondur MR" and "MRS," Isonate 901" and "390P," and "PAPI." A list of useful commercially available polyisocyanates is found in *Encyclopedia of Chemical Technology*, Othmer, 2nd ed., p. 146–147, Interscience Pub., 1967 and in Appendix A of *Polyurethanes: Chemistry and Technology*, by Saunders & Frisch, part I, Interscience Pub. (New York, 1962). Urethane prepolymers, sometimes referred to as isocyanate-terminated prepolymers, can also be used and are known (e.g. see U.S. Pat. Nos. 3,073,802 and 3,054,755), such prepolymers being prepared by reacting aromatic or so-called polymeric polyisocyanates with a polyol such as polyoxyalkylene polyol, typically, polypropylene glycol, using an excess of the polyisocyanate. Mixtures of various polyisocyanates can also be used to prepare the polymers. The polyisocyanates which are preferred are those commonly used in conjunction with polyols to prepare polyurethanes, including so-called urethane prepolymers.

Where the polyisocyanurate is prepared by polytrimerizing polyisocyanate in the presence of polyol, conventional polyols used in making polyurethanes can be used. Such polyols include polyoxyalkylene polyols and polyesters and polyester amides containing reactive hydroxyl groups. The polyols can have varying molecular weights, for example, between 90 and 3,000 or even as high as 5,000. Where a harder polyisocyanurate is desired, the polyol will generally have a hydroxyl equivalent weight of 45 to 400 (i.e., one reactive hydroxyl group per 45 to 400 molecular weight of polyol). Where a softer, more rubbery polyisocyanurate is desired, the polyol will generally have an equivalent weight of 400 to 1,000, or higher. The polyoxyalkylene polyols are generally condensates of ethylene, propylene, or butylene oxides with glycerol, pentaerythritol, sorbitol, sucrose, methylglucosides, or low molecular polyols, such as propylene glycol, tri-, tetra-, penta-, hexa-methylene glycols, 1,3-butylene glycol, 1,3 (2 ethyl) hexanediol, 2,2,4-trimethyl-1,3-pentanediol, trimethylol propane, 1,2,6-hexanetriol, or phenyldiisopropanolamine. Polyoxypropylene polyols are particularly useful and readily commercially available (see appendix B of Saunders & Frisch, supra).

Where the polyisocyanurate of this invention is made from polyisocyanate-polyol reaction mixtures, the mixtures can have NCO/OH equivalent ratios greater than 1, preferably at least about 1.2/1 to 6/1. Generally, the greater this ratio, the greater amount of isocyanurate linkage in the resulting product and the greater its hardness. The preferred products are those which are highly crosslinked by reason of having about 20 to 85% of the isocyanate groups in the reaction mixture converted to isocyanurate linkages or, in the event that moisture is present during polymerization, also urea linkages.

Where a more highly crosslinked polymer is desired, a polyol-diisocyanate reaction mixture can include a conventional triisocyanate or a triol. The reaction mixture can also include modifying mono-isocyanates or alcohols such as 1,4-butane diol, butyl "Cellosolve," butyl "Carbitol," and oleyl alcohol, to impart special properties to the polymer product, such as the degree of final hardness.

The polytrimerization of the polyisocyanate reactant can be carried out with an amount of the organic carbonate salt sufficient to promote polytrimerization. This amount will be at least a catalytic amount, e.g., up to 10 weight percent of the polyisocyanate and preferably 0.5 to 5 weight percent of the polyisocyanate. The exact amount to be used will vary depending on the acidity of the isocyanate and polyol. Catalyst in excess of the amount required should be added to neutralize acid that may be present.

Filled polymer products can be made by incorporating into the reaction mixtures a host of different powdered, granular, fibrous or finely divided fillers (e.g. 5 to 95 weight percent of the reaction mixture) such as clay, talc, rubbery granular aggregate such as vulcanized rubber obtained as scrap from automobile or truck tires, titanium dioxide, diatomaceous earth, glass microbubbles, glass fibers and the like. Hollow glass spheroids or microbubbles are useful in making light-weight polyisocyanurate celluar articles.

Co-reactant materials, such as the diamines described in U.S. Pat. No. 3,248,454 can also be included in the polyolpolyisocyanate reaction mixture, e.g., to increase the viscosity or moldability thereof as well as to increase the hardness of the resulting product. Fire retardant fillers, such as polyvinyl chloride and antimony or phosphorus compounds can also be incorporated into the reaction mixture.

Foamed or porous polyisocyanurate products of this invention can be made by incorporating a small amount of water and/or by blowing the reaction mixture with a suitable blowing agent such as those disclosed in U.S. Pat. No. 3,072,532. Conventional foam stabilizing agents such as silicone oils or organo-silicones can also be incorporated into such reaction mixtures to obtain foamed products with controlled porosity. Other useful foam stabilizers that can be used in conjunction with the organic carbonate salt catalysts of this invention include polyol soluble organic compounds or polyvalent metals, such as tin, lead, or mercury (see British Pat. No. 1,053,383). Examples of such materials are phenylmercuric acetate, phenylmercuric oleate, mercuric octoate, mercuric naphthenate, lead octoate, lead naphthenate, dibutyl tin dilaurate, dibutyl tin diacetate, and similar compounds.

The polyisocyanurate polymer is a crosslinked polymer characterized by containing a plurality of isocyanurate linkages which impart thermal stability to the polymer. Each such linkage, resulting from the trimerization of 3 isocyanate groups, —NCO, have the formula

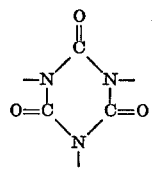

The organic carbonate salts used in this invention catalyze, promote or accelerate the formation of such isocyanurate linkages and, where polyol is present during trimerization, the organic carbonate salts of the invention also promote the concurrent formation of urethane linkages. By polytrimerizing isocyanate prepolymers based on polyols, the polyisocyanurates will also have urethane linkages which are inherently present in the isocyanate prepolymers. (Thus, the term "polyisocyanurate" as used herein generically denotes a polymer having a plurality of isocyanurate linkages as well as a polymer having a plurality of isocyanurate linkages and urethane linkages unless indicated otherwise.) These polyisocyanurates can have crosslink densities of 1 crosslink per 400 to 20,000 atomic weight units of polymer, the preferred rubbery polyisocyanurates having a crosslink density of 1 crosslink per 1,000 to 5,000 atomic weight units.

In addition to the aforementioned thermal stability, these polymers, more importantly, are hydrolytically stable and no significant change in physical properties, such as hardness, occurs in these polymers on standing or in use, even upon immersion in water or upon being subjected to high humidity and temperature environments (e.g., when tested by the procedure described in *Insulation*, August 1968, p. 39).

The polyisocyanurate products of this invention can be used as binders for various fillers, such as vulcanized rubber aggregate, to provide paving surface, particularly such as those tracks or fields used for athletic or sporting purposes, and as coatings to provide protective surfaces, for example as rain-proof or water-resistant coating for clothing. They can be used as laminating or prepregnating resins for sheets of glass fiber and as adhesives for bonding metal to metal, wood to wood, and metal to wood, and as potting compositions for insulating magnet coils or other electrical devices. They also can be used as tooling resins and to form shaped articles such as electrical connectors. The superior hydroltyic stability of the polyisocyanurate products of this invention means that they can be shaped in the form of articles that are subject to moisture contact during use or which come into contact with aqueous solvents or water, such as gaskets, seals, etc.

Further objects and advantages of this invention will be illustrated in the following Examples, though particular materials and amounts thereof recited in these Examples, as well as other details, should not be construed to unduly limit this invention. The parts recited in the Examples are by weight.

EXAMPLE 1

A dipropylene glycol solution of mono-sodium salt of dipropylene glycol was prepared by mixing 9.3 parts of a 51.6 weight percent aqueous sodium hydroxide with 63.5 parts dipropylene glycol, heating the mixture to 120° C., maintaining the mixture at 120° C. for 8 hours, and thereafter removing 4.6 parts water by vacuum distillation. The resultant solution was allowed to cool to 38° C. and then about 5.5 parts carbon dioxide was added with agitation by mechanical stirring, causing an exotherm which was maintained at 50° C. for 15 minutes with continued agitation, forming 75 parts sodium 2(2'-hydroxypropoxy)-1-methylethyl carbonate in dipropylene glycol at a concentration of about 35% by weight or about 1.6 meq./g., the carbonate salt having the formula

EXAMPLE 2

Polyethylene glycol having a molecular weight of 1,000 (15 parts) was mixed in a vial with varying amounts of the carbonate salt solution described in Example 1. The resultant solutions were mixed with 15 parts polymethylene polyphenyl polyisocyanate having an equivalent weight of about 135 and being sold under the trade designation "Mondur MRS." The resultant curable polyisocyanate-polyol-carbonate salt mixtures were allowed to cure at room temperature and the time required for the mixture to "gel" was noted. (The curable mixtures were all viscous pourable fluids. The gel time was the amount of time required for the viscosity to increase such that the curable composition could not be poured from the vial.) The amount of carbonate salt solution and the gel times are shown in Table 1 below.

TABLE 1

| Example number | Parts salt solution | Gel time (hours) |
|---|---|---|
| 2a | 0.1 | 8 |
| 2b | 0.2 | 2 |
| 2c | 0.3 | 1 |

As can be seen, the gel time is a function of catalyst concentration, providing sufficient time to apply the catalyzed curable mixture with good control of the pot-life thereof. By contrast, using the same amounts of a solution of mono-sodium dipropylene glycol (also a catalyst), the gel time is nearly instantaneous, being so rapid as to preclude almost any handling.

EXAMPLE 3

Urethane-modified polyisocyanurate was prepared by mixing 15 parts polyethylene glycol having a molecular weight of 1,000 with 0.25 part of the carbonate salt solution of claim 1 and 15 parts polymethylene polyphenyl polyisocyanate having an equivalent weight of about 135 and being sold under the trade designation "Mondur MRS," and heating the resultant mixture for 10 minutes at about 120° C. The resultant urethane-modified polyisocyanurate polymer was a hard resinous material having a tensile strength of 3200 p.s.i. and an elongation at break of 30% when tested on an "Instron" testing device.

EXAMPLE 4

To a mixture containing 45 parts of polypropylene ether triol having a molecular weight of 3000 sold under the trade designation "Niax LG–56," 5 parts N-phenyldiisopropanol amine sold under the trade designation "Isonol C–100," and 1.5 parts of the carbonate salt solution described in Example 1, was added 50 parts polymethylene polyphenyl polyisocyanate sold under the trade designation "Mondur MRS." The resultant curable mixture cured at room temperature after 10 minutes to a hard resinous product having a tensile strength of about 3700 and an elongation at break of about 25%.

EXAMPLE 5

The ingredients shown below were mixed and permitted to cure at room temperature.

Ingredients: Parts
- Polypropylene ether triol _____ 52
- N-phenyldiisopropanol amine [1] _____ 15
- Carbonate salt solution of Example 1 _____ 1.5
- Polyisocyanate described in Example 4 _____ 33.3

[1] Sold under the trade designation "Isonol C–100."

After 10 minutes the product cured to a hard mass. The resultant cured product had a tensile strength of 1800 p.s.i. and an elongation at break of 130%.

EXAMPLE 6

The ingredients shown below were mixed and permitted to cure at room temperature.

Ingredients: Parts
- DB castor oil _____ 25
- Polypropylene ether triol _____ 52
- Carbonate salt solution described in Example 1 _ 1.5
- Polyisocyanate described in Example 4 _____ 50

After 15 minutes of cure time, there was produced a hard resinous product having a tensile strength of 3000 p.s.i. and an elongation at break of about 35%.

EXAMPLE 7

Component A
Ingredients: Parts
- Polyoxypropylene glycol having a molecular weight of 2000 _____ 4
- Polyoxypropylene triol having a molecular weight of 240 _____ 6
- Carbonate salt described in Example 1 _____ 0.2

Component B
Ingredient
Polyisocyante described in Example 4.

By mixing 1 part of Component A with 1 part of Component B a useful polycyanurate adhesive composition was prepared. The mixed composition could be used to bond a variety of surfaces together, for example, polyester film to polyester film or to polyurethane film, and polyurethane sheeting to polyurethane or natural rubber or to loose fiber mat.

The pot life of the mixture was about 1 hour. Tough strong bonds between bonded materials had formed in about 2.5 hours at room temperature.

EXAMPLE 8

An organic carbonate salt/polyoxypropylene triol solution was prepared by mixing 86 parts glycerin with 3.2 parts of 90 wt. percent aqueous potassium hydroxide at 115° C. in a closed vessel to produce the potassium monosalt of the triol, pressurizing the vessel with propylene oxide gas (about 1450 parts) to a pressure of 50 p.s.i.g., heating the contents of the vessel to 125° C., maintaining 125° C. while stirring for an additional two hours, opening the vessel and evacuating its contents for about 1 hour at a pressure of 25 millimeters of mercury while maintaining a temperature at 125° C. to remove unreacted propylene oxide, adding two and one-half parts carbon dioxide with additional stirring for about 15 minutes, and cooling the resultant mixture to room temperature. The yield was 1540 parts of carbonate salt/triol solution in which the polyoxypropylene triol has a molecular weight of about 1500.

EXAMPLE 9

Repeating the procedure outlined in Example 8, except replacing the glycerin with 47.5 parts propylene glycol, there was prepared 1490 parts of another carbonate salt/polyoxypropylene triol solution in which the triol has a molecular weight of about 2000.

EXAMPLE 10

A liquid curable composition was prepared by mixing 20 parts of the carbonate salt/polyol solution described in Example 8 and 10 parts of the polyisocyanate described in Example 4. The curable coating composition was coated on polyester film ("Mylar") and cured thereon by heating at 100° C. for three minutes, forming a flexible self-supporting layer which tenaciously adhered to the polyester film.

EXAMPLE 11

Twenty parts of the carbonate salt/polyol solution described in Example 9 was mixed with 10 parts of the polyisocyanate described in Example 4, the mixture coated on polyester film, and the coating heated at 100° C. for three minutes, producing a flexible self-supporting coating similar to that described in Example 10.

EXAMPLE 12

A solid composite formed of vulcanized rubber particles in a polyisocyanurate matrix was prepared by mixing the following ingredients:

Ingredients: Parts
- Vulcanized rubber particles _____ 400
- Polyoxypropylene glycol (2000 mol weight) ___ 50
- Polyoxypropylene triol (1500 mol weight) _____ 15
- Carbonate salt/polyol solution as described in Example 1 _____ 3
- Polyisocyanate as described in Example 4 _____ 32

The vulcanized rubber particles were obtained by abrading or shredding used motor vehicle tires and selecting the particles which passed through a screen having ½" openings.

In preparing the composite, the glycol, triol, carbonate salt/polyol solution, and polyisocyanate, were mixed in a container to provide a homogeneous blend having a NCO/OH equivalent ratio of about 2/1. The vulcanized rubber particles were then added to the mixture and mixed until the particles were uniformly wetted or coated with the mixture. The mass of coated particles was then poured into a 1' x 2' x 8" flat rectangular mold with a flat cover, pressuring the cover against the mass at a pressure of 25 lbs. per sq. ft. while it cured. The cured composite had a density of about 0.7 g./cc., a void content of 40 vol. percent, and physical properties as described below:

Tensile strength (ASTM D-412) _____ p.s.i.__ 75
Elongation (ASTM D-412) _____ percent__ 32
Tear strength (ASTM D0624, Die C) _____ p.s.i.__ 22
Compression modulus (ASTM D-575):
  At 10% compression _____ p.s.i.__ 15
  At 50% compression _____ p.s.i.__ 350
Impact resilience (ASTM D-2632) _____ 28
Hydrolytic stability [1] _____ days [2]__ 31

[1] Measured at 100° C. and 95% relative humidity according to the method described in *Insulation*, August 1968, page 39.
[2] No change in structural integrity noted after 31 days.

A ¼" thick layer of the composite prepared as described above was bonded to an asphalt substrate with a conventional two-part room temperature-curable polyurethane adhesive to provide a structure useful as resilient surfacing or pavement for pedestrian or vehicular traffic. The polyurethane adhesive used had the following formulation:

Part A

| | Parts by wt. |
|---|---|
| Polypropylene glycol (2000 mol weight) | 50.33 |
| Litharge catalyst | 0.20 |
| Pigment millbase (a mixture of green and yellow pigments and carbon black in polypropylene glycol, 2000 mol weight) | 1.90 |
| Calcium octoate wetting agent | 0.40 |
| Clay filler | 46.00 |
| Ethyl Cellosolve hardness modifier | 0.80 |
| Asbestos fiber thickener | 0.25 |
| Phenylmercuric acetate catalyst | 0.12 |

Part B

| | Parts by wt. |
|---|---|
| Polymethylene polyphenyl polyisocyanate (Mondur MRS) | 9.0 |

EXAMPLE 13

To 100 parts of isocyanate prepolymer (having an isocyanate equivalent weight of about 170) and being prepared by reacting 66.1 parts of mixed tolylene diisocyanate isomers with 17.7 parts of polypropylene glycol (mol wt. 2000) and 16.2 parts tripropylene glycol, was added 1 part of the carbonate salt/polyol solution described in Example 1. The resultant mixture gelled in about 5 minutes at room temperature to form a hard, brittle, polyisocyanurate which was found to be useful as a binder for laminating glass cloth laminates.

EXAMPLE 14

50 parts of the isocyanate prepolymer described in Example 13 was mixed with 50 parts of polypropylene ether triol (mol wt. 3000) and 1 part of the carbonate salt/polyol solution described in Example 1, producing after, 25 minutes at room temperature, a tough semi-rigid polyisocyanurate which was found to be useful as a potting resin, glass cloth laminating resin, and as a binder for making composites.

EXAMPLE 15

Alkoxide-borate carbonate salts having 10%, 30% and 50% of the theoretical amount of carbonate were prepared by dissolving 7.2 parts sodium hexyl carbitol in 20.3 parts of trihexyleneglycol diborate in three vials, and adding respectively 0.164 part, 0.492 part, and 0.82 part carbon dioxide. A control was also prepared having no carbonate by mixing 7.2 parts sodium hexyl carbitol in 20.3 parts trihexyleneglycol diborate.

The alkoxide-borate carbonate salts and the control were used in varying amounts to cure a mixture comprised of 15 parts polypropylene ether triol having a molecular weight of 3000 and 15 parts poly(methylene phenyl isocyanate) having an equivalent weight of 133 and being sold under the trade designation "Isonate 901." The salt concentration, curing temperatures and gel times are shown in Table 2 below:

TABLE 2

| Concentration, percent | Cure temperature, °C. | Gel times (minutes) Catalyst | | | |
|---|---|---|---|---|---|
| | | Control, 0% carbonate | 10% carbonate | 30% carbonate | 50% carbonate |
| 1 | 23 | (1) | (1) | (1) | (1) |
|   | 100 | (1) | (1) | (1) | (1) |
| 1.5 | 23 | 1.6 | 2.3 | | |
|   | 100 | | 2.0 | (1) | |
| 2.0 | 23 | 1.3 | 1.3 | 5 | (1) |
|   | 100 | | 1 | 1 | 2 |
| 3.0 | 23 | 0.4 | 1 | 1 | (1) |
|   | 100 | | 1 | 1 | 1 |
| 4.0 | 23 | 0.1 | 0.95 | 0.8 | 4.5 |
|   | 100 | 0.1 | 1 | 1 | 1 |
| 5.0 | 23 | 0.1 | | | 1.6 |
|   | 100 | 0.1 | | | 1 |

[1] No cure.

As can be seen, concentrations up to about 3% of the non-carbonated control produce fast gel times at room temperature, requiring from about 1.3 to 0.4 minutes. At higher concentrations the control gel times are extremely short, 0.4 minute or less. By contrast, the carbonate salt catalyst of the invention, producing gel times from 0.7 to 4.5 minutes, provide sufficient pot life to permit coating or molding.

Various modifications and alterations of this invention will become apparent to those skilled in the art without departing from the scope and spirit of this invention.

What is claimed is:

1. A method of making poly(isocyanurate-urethane) comprising mixing polyisocyanate with polyol in the presence of an effective amount of a carbonate salt polymerization catalyst having the formula $$(A)_n - R - O - CO_2^- M^+$$

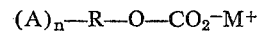

wherein A is a hydroxyl group or a hydrogen atom; R is a polyvalent organic group; $n$ is an integer equal to $p-1$, where $p$ is the valence of R and $M^+$ is an alkali metal cation or a quaternary ammonium cation wherein the alkyl groups have from 1 to 18 carbon atoms each.

2. The method according to claim 1 wherein said carbonate salt is used in the form of a polyol solution.

3. The method of claim 1 wherein R is alkyleneoxy-alkylene or poly(alkyleneoxy)-alkylene, and $M^+$ is an alkali metal cation.

4. The method according to claim 1 wherein said R is propyleneoxypropylene and $M^+$ is sodium or potassium cation.

5. The method according to claim 1 wherein said R is poly(propyleneoxy)propylene and $M^+$ is sodium or potassium cation.

6. The method according to claim 1 wherein said carbonate salt is used as a solution in polyoxypropylene glycol or triol.

7. The method of claim 1 wherein said carbonate salt is sodium 2(2'-hydroxypropy)-1-methylethyl carbonate.

8. A solution of carbonate salt as defined in claim 1 in a polyol.

9. The solution of claim 8 wherein said polyol is dipropylene glycol, polyoxypropylene glycol, or polyoxypropylene triol.

References Cited

UNITED STATES PATENTS

| 3,381,008 | 4/1968 | Steyermonk | 260—77.5 NC |
| 3,711,444 | 1/1973 | Allen et al. | 260—77.5 NC |
| 3,715,337 | 2/1973 | Allen et al. | 260—77.5 NC |

MAURICE J. WELSH, Primary Examiner

U.S. Cl. X.R.

117—161; 156—331; 252—182, 192, 431 C, 476; 260—215 AW, 37 N, 77.5 AB, 77.5 AC